United States Patent
Yun et al.

(10) Patent No.: US 12,002,303 B2
(45) Date of Patent: Jun. 4, 2024

(54) VEHICLE COLLISION TEST METHOD

(71) Applicant: TUV SUD Korea LTD., Seoul (KR)

(72) Inventors: Jaewoong Yun, Seoul (KR); Minkyu Shim, Seoul (KR); Byunghyun Park, Anyang-si (KR); Chaegyeong Park, Seoul (KR); Jahyong Choi, Seoul (KR)

(73) Assignee: TUV SUD Korea LTD., Seoul (KR)

( * ) Notice: Subject to any disclaimer, the term of this patent is extended or adjusted under 35 U.S.C. 154(b) by 0 days.

(21) Appl. No.: 18/451,603

(22) Filed: Aug. 17, 2023

(65) Prior Publication Data

US 2024/0062591 A1  Feb. 22, 2024

(30) Foreign Application Priority Data

Aug. 17, 2022 (KR) .................. 10-2022-0102537

(51) Int. Cl.
*G07C 5/04* (2006.01)
*G07C 5/08* (2006.01)
(52) U.S. Cl.
CPC ............. *G07C 5/04* (2013.01); *G07C 5/085* (2013.01)
(58) Field of Classification Search
None
See application file for complete search history.

(56) References Cited

U.S. PATENT DOCUMENTS 8,868,326 B2 * 10/2014 Heinrichs-Bartscher ..................
  B60T 7/22
  701/70
2018/0297545 A1 * 10/2018 Yamaguchi ............ G07C 5/085

FOREIGN PATENT DOCUMENTS

JP   2002-163797 A    6/2002
JP   2013-544203 A   12/2013

* cited by examiner

*Primary Examiner* — Abdhesh K Jha
(74) *Attorney, Agent, or Firm* — Bridgeway IP Law Group, PLLC; Jihun Kim (57) ABSTRACT

A vehicle collision test method comprises the steps of: setting a speed and a target acceleration of a target vehicle; observing a speed and an acceleration of a subject vehicle corresponding to the set speed and target acceleration of the target vehicle; decelerating the subject vehicle and calculating a time-to-collision (TTC) when a first threshold time is exceeded after deceleration of the target vehicle; and storing as a risk scenario including information on the subject vehicle when the calculated time-to-collision is shorter than a second threshold time longer than the first threshold time.

7 Claims, 7 Drawing Sheets

VEHICLE COLLISION TEST METHOD

BACKGROUND OF THE INVENTION

Field of the Invention

The present invention relates to a vehicle collision test method, and more specifically, to a collision test of a vehicle following a preceding vehicle, i.e., a vehicle collision test method for generating a collision test method and developing a more accurate and safe vehicle test method through the generated collision test method.

This application is carried out with the support of the Ministry of Land, Infrastructure and Transport and National Transport Science and Technology Agency (Task No. 21AMDP-C160637-01)

BACKGROUND OF THE RELATED ART

Recently, various driver assistance systems (DAS) are developed to deliver driving information of a vehicle to a driver to prevent accidents caused by driver's negligence and enable autonomous driving for driver's convenience.

For example, there is a technique of acquiring a distance to another vehicle through an electromagnet mounted on the bumper of a vehicle and determining a collision situation and supplying power to the electromagnet when the acquired distance to another vehicle is within a predetermined distance so that magnetic force may be generated and the vehicle may be automatically stopped in the event of a collision situation.

As another example, there is a vision technique provided in a vehicle to acquire images around the vehicle and control driving of the vehicle based on the acquired images.

These autonomous driving techniques are closely related to safety of drivers. For example, it is essential for a vehicle that follows a preceding vehicle using autonomous driving techniques to sense stop or deceleration of the preceding vehicle not too late to prevent a collision and appropriately respond. Therefore, various tests are developed to prepare for a collision of an autonomous vehicle or to measure a degree of safety in a collision.

Such a collision test may test performance of a vehicle even when the vehicle is stopped by the driver's intention, as well as performance of autonomous driving. Accordingly, it is necessary to select and develop test situations (scenarios) considering various factors related to collision of a vehicle, and review accuracy and effectiveness of the developed test techniques.

SUMMARY OF THE INVENTION

Therefore, the present invention has been made in view of the above problems, and it is an object of the present invention to provide a collision test method of a vehicle following a preceding vehicle.

In addition, another object of the present invention is to increase accuracy of a vehicle collision test method, in which all possible scenarios of the vehicle collision test method are selected, and the selected scenarios are applied.

In addition, another object of the present invention is to select scenarios possible in the vehicle collision test method and measure safety of vehicles in the case of a collision by applying the selected scenarios.

To accomplish the above objects, according to one aspect of the present invention, there is provided a vehicle collision test method comprising the steps of: setting a speed and a target acceleration of a target vehicle (Traffic Simulation Vehicle; TSV); observing a speed and an acceleration of a subject vehicle (Vehicle Under Test; VUT) corresponding to the set speed and target acceleration of the target vehicle; decelerating the subject vehicle and calculating a time-to-collision (TTC) when a first threshold time is exceeded after deceleration of the target vehicle; and storing information on the subject vehicle when the calculated time-to-collision is shorter than a second threshold time longer than the first threshold time.

In addition, the step of storing information on the subject vehicle when the calculated time-to-collision is shorter than a second threshold time longer than the first threshold time may include the steps of: setting the speed of the target vehicle to be divided into section intervals; setting the acceleration of the target vehicle to be divided into section intervals; selecting a plurality of scenarios by combining the set section intervals of the speed of the target vehicle and the set section intervals of the acceleration of the target vehicle; and selecting as a selection scenario when the calculated time-to-collision is shorter than the second threshold time for the plurality of scenarios.

In addition, the step of selecting as a selection scenario when the calculated time-to-collision is shorter than the second threshold time for the plurality of scenarios may include the steps of: calculating a time-to-collision of the subject vehicle at preset time intervals; and selecting a minimum time-to-collision among the calculated time-to-collisions as a selection scenario.

In addition, the step of selecting a minimum time-to-collision among the calculated time-to-collisions as a selection scenario may include the steps of: storing as a selection scenario when the minimum time-to-collision is shorter than the second threshold time; and storing as a non-selection scenario when the minimum time-to-collision exceeds the second threshold time.

In addition, the first threshold time may be set in consideration of a risk determination time and a pedal transfer mechanical time of the subject vehicle.

In addition, the first threshold time may be calculated in a driving situation in which the speed of the target vehicle equally follows the speed of the target vehicle.

In addition, the first threshold time may be corrected in a driving situation in which the speed of the target vehicle is different from the speed of the target vehicle.

In addition, the step of storing as a selection scenario when the minimum time-to-collision is shorter than the second threshold time may further include the step of storing driving information of the subject vehicle when the minimum time-to-collision is shorter than the second threshold time and the target vehicle stops or displacements of the target vehicle and the target vehicle are equal.

In addition, the step of storing driving information of the subject vehicle may include the step of storing a plurality of variables including the acceleration of the subject vehicle and the time-to-collision calculated at preset time intervals in a matrix form.

In addition, the step of selecting a minimum time-to-collision among the calculated time-to-collisions as a selection scenario may further include the steps of: storing driving information of the subject vehicle stored as the selection scenario or the non-selection scenario in a matrix form; and analyzing a driving habit of the subject vehicle based on the stored driving information of the subject vehicle.

DETAILED DESCRIPTION OF THE PREFERRED EMBODIMENT

Hereinafter, preferred embodiments of the present invention will be described in detail with reference to the drawings.

Since the present invention may make various changes and have various forms, specific embodiments are illustrated in the drawings and described in detail in the specification. However, it should be understood that this is not intended to limit the present invention to the specific disclosed forms, and includes all modifications, equivalents, and substitutes included in the spirit and scope of the present invention.

Figure 1:
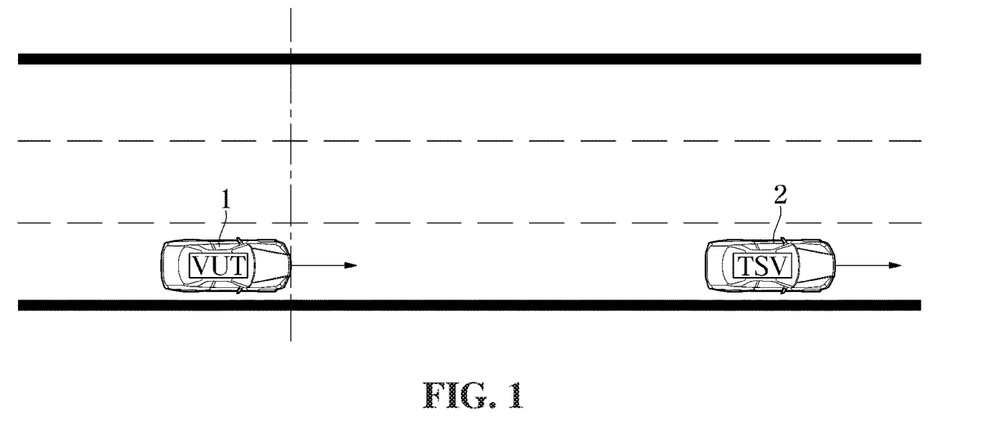
FIG. 1 is a schematic diagram showing a target vehicle and a subject vehicle following the target vehicle according to an embodiment of the present invention.

FIG. 1 is a schematic diagram showing a target vehicle and a subject vehicle following the target vehicle according to an embodiment of the present invention.

FIG. 1 shows a target vehicle (Traffic Simulation Vehicle; TSV) 2 and a subject vehicle (Vehicle Under Test; VUT) 1 following the target vehicle. In FIG. 1, it is assumed that the target vehicle 2 and the subject vehicle 1 drive in a single lane.

Generally, a subject vehicle following a target vehicle drives with a predetermined distance to prevent collision. This is the same when a vehicle is driven by the driver's will, as well as when the vehicle is driven by autonomous driving.

For example, the distance between the vehicles is set in consideration of a time-to-collision (TTC), which is a period required until the subject vehicle 1 collides with the target vehicle 2 when the target vehicle 2 reduces speed while the subject vehicle 1 and the target vehicle 2 drive at the same speed and the approaching speed of the subject vehicle 1 is constant.

Figure 2:
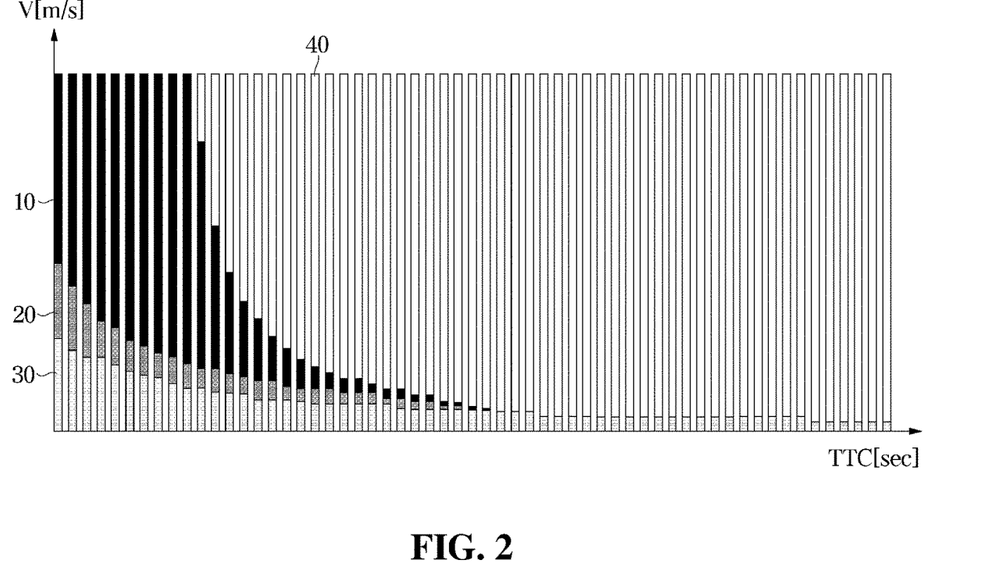
FIG. 2 is a graph showing risk levels of a scenario considering the factors of time-to-collision (TTC) and vehicle speed V in a vehicle collision test method according to an embodiment of the present invention.

Specifically, FIG. 2 is a graph showing risk levels of a scenario considering the factors of time-to-collision (TTC) and vehicle speed V in a vehicle collision test method according to an embodiment of the present invention.

The X-axis in FIG. 2 means the time-to-collision [sec], and the Y-axis means the vehicle speed (m/s). The vehicle speed means the speed of the target vehicle 2 set in the vehicle collision test method. In the vehicle collision test method, since the subject vehicle 1 to be tested follows the set speed of the target vehicle 2, it is assumed that the speeds of the target vehicle 2 and the subject vehicle 1 are the same, i.e., vehicle speed V.

Although a scenario considering only two factors is shown in FIG. 2, various factors such as deceleration (m/s2), road slope (%), initial relative distance between the subject vehicle 1 and the target vehicle 2, and the like, in addition to the TTC and the vehicle speed, may be added to the factors considered in the vehicle collision test method.

Observing FIG. 2 in detail, a 'not avoidable scenario 10' is marked as a black area. The smaller the TTC and the higher the vehicle speed, it corresponds the 'not avoidable scenario'. A 'failure scenario 20' is a scenario that is safer than the 'not avoidable scenario', but is not considered as safe, and is marked as a gray area. A 'critical scenario 30' is a scenario that can be regarded as relatively safe, and is marked in light gray. Finally, the white area shows a 'Nominal Scenario' 40, which is a general driving situation that cannot be regarded as a collision situation.

These scenarios may be generated in various combinations according to the types of factors to be considered and the number of corresponding sections of each factor.

For example, 11 sections of the vehicle speed V may be set at the intervals of km/hr in a range of 10 to 110 km/hr. As another example, 9 sections of the deceleration of the subject vehicle may be set at the intervals of 1 $m/s^2$ in a range of 0 to 8.33 $m/s^2$. Accordingly, 11*9 scenarios, i.e., 99 scenarios, combining the vehicle speed and the deceleration factor of the subject vehicle may be generated.

For example, sampling of 99 scenarios may be performed in the vehicle collision test method. In the sampling, a threshold TTC may be set, and a scenario having a TTC lower than the threshold TTC may be finally selected as a selection scenario.

For example, when the threshold TTC is selected as 1.5 [sec] in the 99 scenarios described above, finally sampled selection scenarios may be reduced to 22 scenarios. The method of determining the threshold TTC will be described below with reference to FIGS. 6 to 8.

Figure 3:
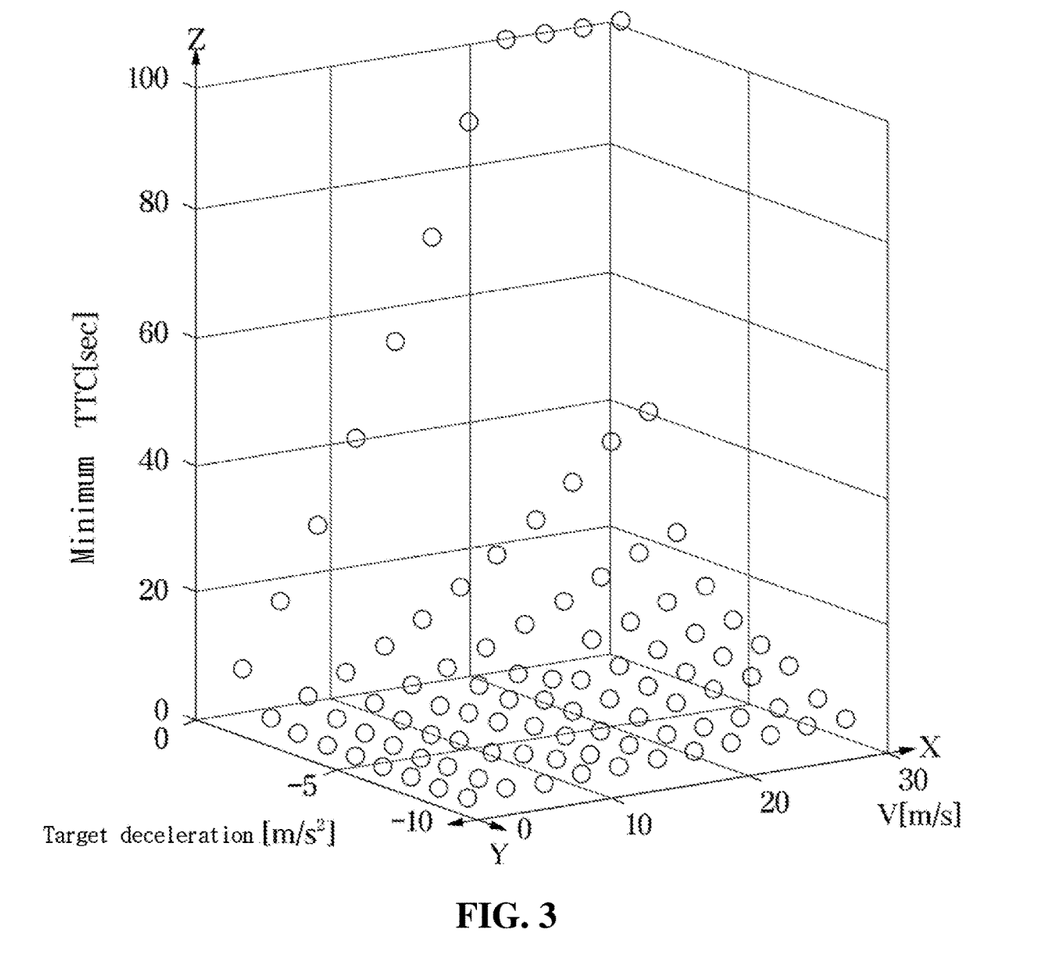
FIG. 3 is a graph showing the speed, deceleration, and minimum TTC of vehicles (TSV and VUT) in each scenario generated by the vehicle collision test method according to an embodiment of the present invention.

Next, FIG. 3 is a graph showing the speed, deceleration, and minimum TTC of vehicles (TSV and VUT) in each scenario generated by the vehicle collision test method according to an embodiment of the present invention.

The X-axis in FIG. 3 means the speeds (m/s) of the target vehicle 2 and the subject vehicle 1, the Y-axis means the target deceleration (m/s2), and the Z-axis means the minimum TTC. In the same manner as shown in FIG. 2, in the vehicle collision test method, since the subject vehicle 1 to be tested follows the set speed of the target vehicle 2, it is assumed that the speeds of the target vehicle 2 and the subject vehicle 1 are the same, i.e., vehicle speed V.

Each point in FIG. 3 is marked to correspond to a combination of the scenarios described above. That is, FIG. 3 shows 99 scenarios, which are generated by combining the vehicle speed in each of the 11 sections generated at the intervals of 10 km/hr in a range of 10 to 110 km/hr and the deceleration of the subject vehicle in each of the 9 sections generated at the intervals of 1 $m/s^2$ in a range of 0 to 8.33 $m/s^2$, and a minimum TTC corresponding to each scenario.

In the vehicle collision test method, sampling may be performed for the 99 scenarios. In the sampling, a threshold TTC may be set, and some of the scenarios having a TTC lower than the threshold TTC may be finally selected as selection scenarios.

Figure 4:
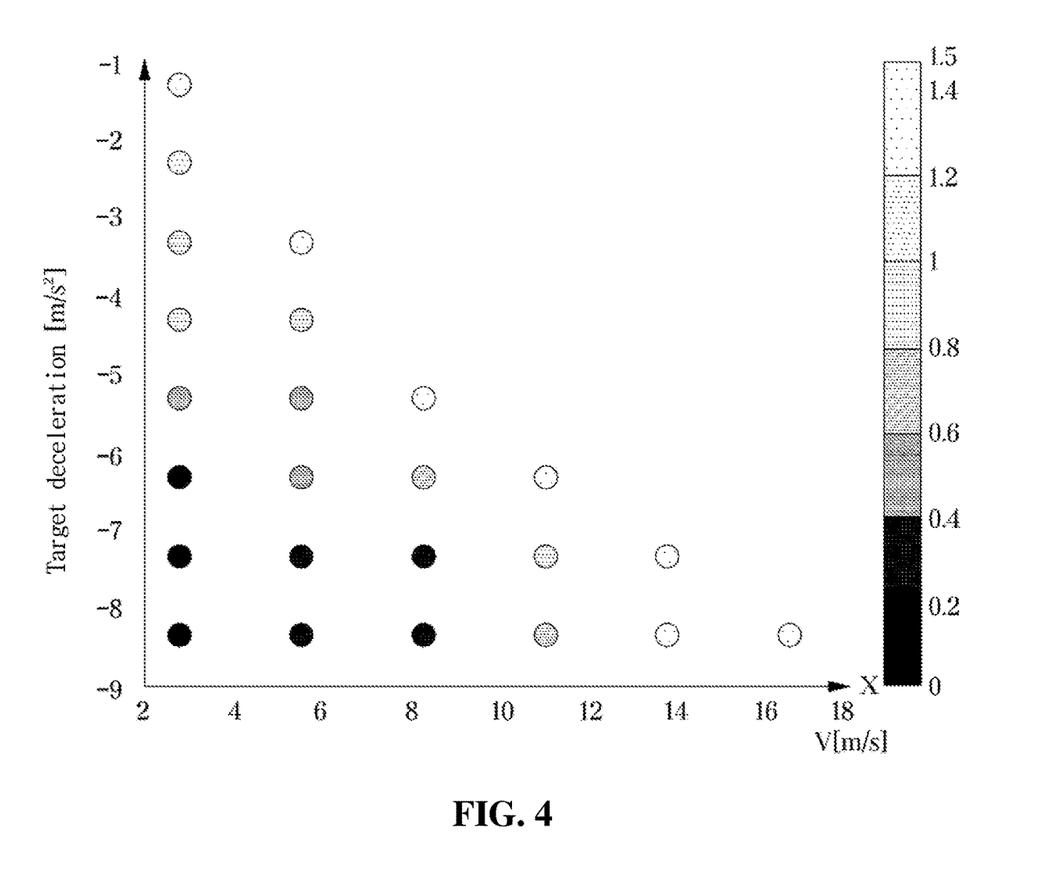
FIG. 4 is a graph showing risk levels of each scenario in the case of a TTC lower than a threshold TTC in a collision test method according to an embodiment of the present invention.

FIG. 4 is a graph showing risk levels of each scenario in the case of a TTC lower than a threshold TTC in a collision test method according to an embodiment of the present invention. For example, FIG. 4 shows a graph of selection scenarios having a TTC lower than the threshold TTC when the threshold TTC is set to 1.5 [sec]. Here, the X-axis means vehicle speed, and the Y-axis means deceleration.

That is, when the threshold TTC is selected as 1.5 [sec] in the 99 scenarios described above, finally sampled selection scenarios are 22 scenarios.

In addition, in FIG. 4, the risk level is displayed to be different in each scenario.

Specifically, it can be confirmed in the 22 scenarios that scenarios with a higher risk level are displayed darker. In FIG. 4, 24 points (pt) are displayed, but two of the points are not included in the counting of the final number of scenarios since the points are scenarios of not avoidable collision.

That is, it is known that the higher the vehicle speed, the fewer the scenarios having a time-to-collision lower than the threshold TTC, and the risk level is relatively lowered, whereas and the lower the vehicle speed, the more the scenarios having a time-to-collision lower than the threshold TTC, and the risk level increases relatively.

Figure 5:
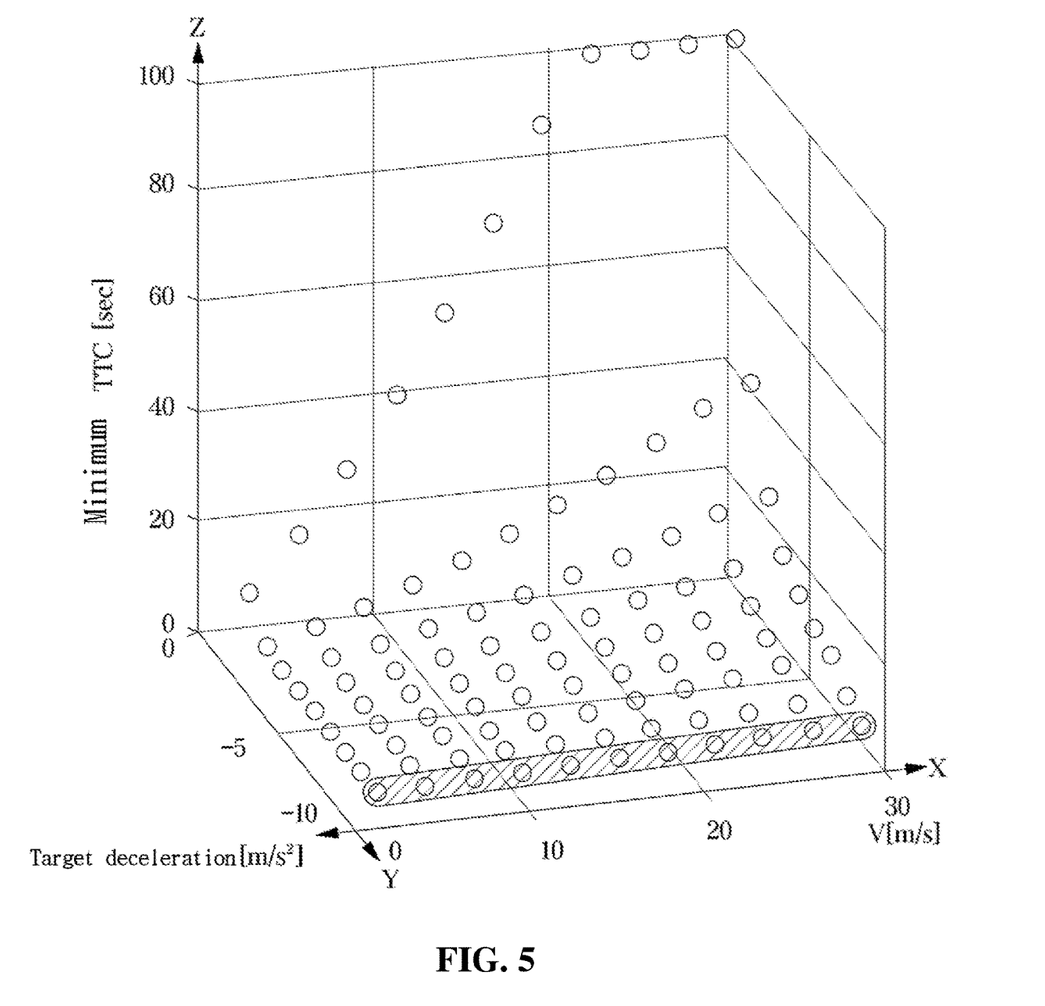
FIG. 5 is a graph showing the speed, deceleration, and minimum TTC of vehicles (TSV and VUT) in each scenario generated according to a collision test method according to an embodiment of the present invention, in which the shaded scenarios correspond to a risk level.

Next, FIG. 5 is a graph showing the speed, deceleration, and minimum TTC of vehicles (TSV and VUT) in each scenario generated according to a collision test method according to an embodiment of the present invention, in which the shaded scenarios correspond to minimum deceleration.

That is, in the vehicle collision test method, it can be confirmed through FIGS. 4 and 5 that when a vehicle has a maximum deceleration or a minimum speed, the possibility of being selected as a selection scenario increases with a value smaller than the threshold TTC.

Next, a driver model will be described in FIG. 6. In the case of the driver model, driving on a highway may be considered as an example, like the subject vehicle 1 shown in FIG. 1 following the target vehicle 2. The driver model is for selecting a scenario for observing the ability of an automatic deceleration function in a sudden deceleration of the target vehicle 2 while the subject vehicle 1 is driving maintaining a predetermined safe distance with the target vehicle 2.

Figure 6:
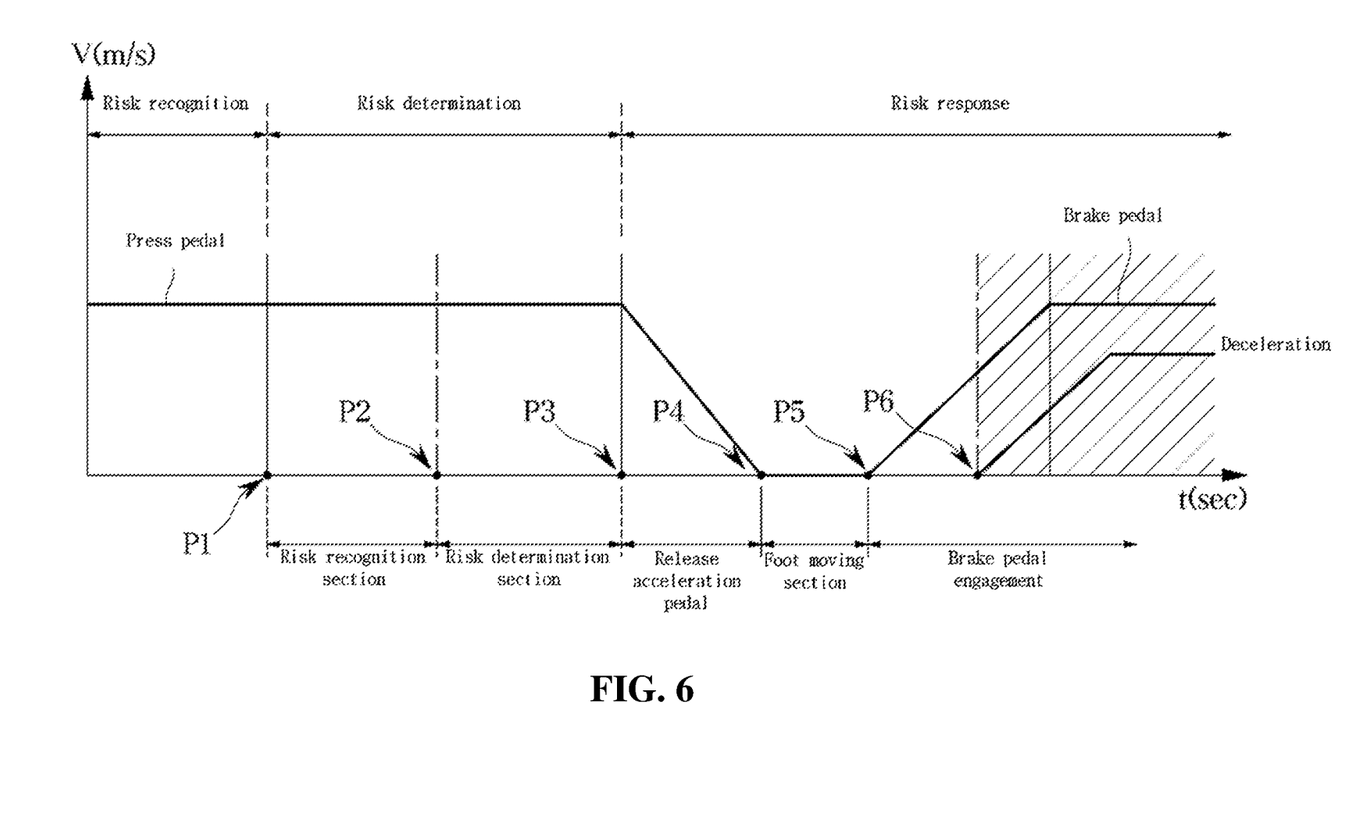
FIG. 6 is a graph showing a driver model of a vehicle collision test method according to an embodiment of the present invention.

As shown in FIG. 6, when it is assumed that a driver actually drives the subject vehicle 1, and although the driver actually recognizes deceleration of the target vehicle 2 for the first time at the danger perception time point p1, the driver will continue to step on the accelerator pedal until time point p3 of determining a danger.

Therefore, the brake pedal begins to be engaged from time point p5 after passing through time point p3 of determining a danger, the section of releasing the accelerator pedal p3-p4, and the section of moving the driver's foot from the accelerator pedal to the brake pedal p4-p5.

In addition, although the driver presses the brake pedal from time point p5, actual deceleration of the subject vehicle 1 begins from time point p6 after passing through the section of beginning the brake operation p5-p6.

Therefore, since the danger perception section actually begins after the target vehicle 2 begins deceleration, the time-to-collision (TTC) may be calculated as shown in [Equation 1] below.

$$TTC = d_{rel}/v_{rel} = d_{rel}(V_{vut} - V_{tsv})$$ [Equation 1]

Here, the TTC denotes the time-to-collision, $d_{rel}$ denotes the distance between the target vehicle (TSV) 2 and the subject vehicle (VUT) 1, and $v_{rel}$ denotes the relative speed between the target vehicle (TSV) 2 and the subject vehicle (VUT) 1, $V_{tsv}$ denotes the speed of the target vehicle (TSV) 2, and $V_{vut}$ denotes the speed of the subject vehicle (VUT) 1.

In the vehicle collision test method, the TTC may be calculated at time intervals of 0.01 [sec]. At this point, when the calculated TTC belongs to a risk scenario, corresponding information may be stored.

The vehicle collision test method may operate on a system or a program stored in a computer readable recording medium. For example, a control unit (not shown) in a system, in which the vehicle collision test method operates, comprehensively controls the vehicle collision test method. In addition, the system in which the vehicle collision test method operates includes a storage unit and stores data values in a matrix form.

That is, although the storage unit may be implemented as at least one among a non-volatile memory device such as a cache, a read-only memory (ROM), a programmable ROM (PROM), an erasable programmable ROM (EPROM), an electrically erasable programmable ROM (EEPROM), or a flash memory, a volatile memory device such as a random-access memory (RAM), and a storage medium such as a hard disk drive (HDD) or a CD-ROM, it is not limited thereto.

That is, the storage unit may be a memory implemented as a chip separate from the control unit described above, or may be implemented as a processor and a single chip.

Until now, scenarios of the vehicle collision test method have been described. Hereinafter, a scenario operation method will be described through selection of variables in consideration of the TTC described in the driver model described in FIG. 6, perception of a risk, determination of a risk, a risk response section, and the vehicle speed.

Figure 7:
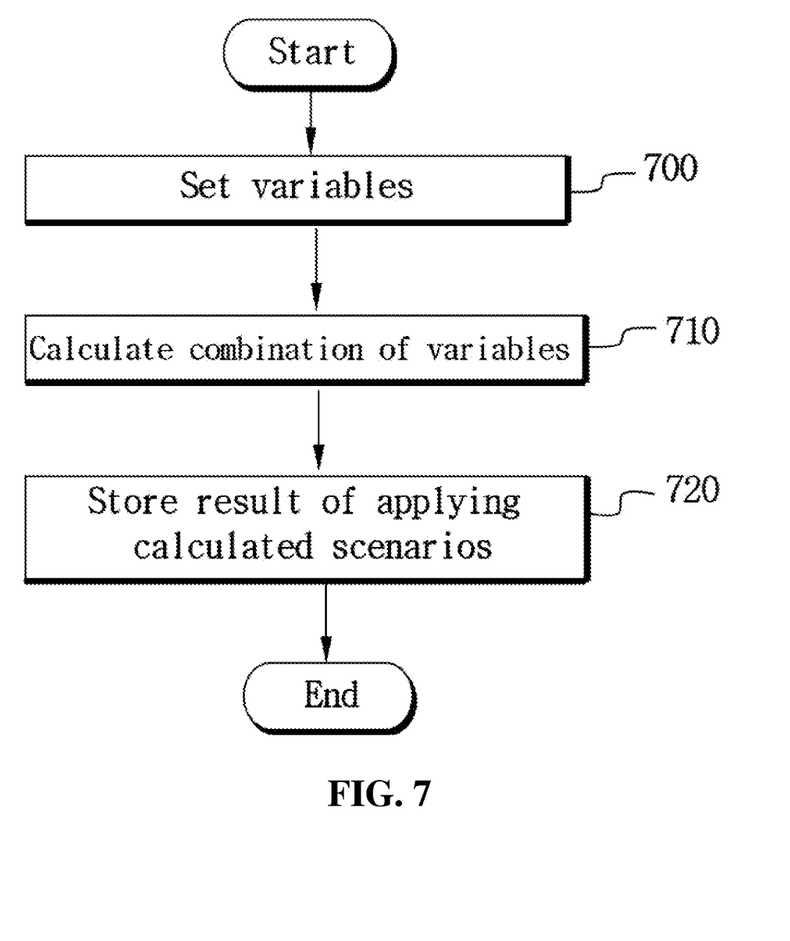
FIG. 7 is a flowchart illustrating a collision test method according to an embodiment of the present invention.

FIG. 7 is a flowchart illustrating a collision test method according to an embodiment of the present invention.

First, as shown in FIG. 7, variables are set to calculate a scenario (700). For example, various variables such as deceleration (m/s2), road slope (%), initial relative distance between the subject vehicle 1 and the target vehicle 2, and the like, in addition to the TTC and the vehicle speed, may correspond to the factors considered in the vehicle collision test method.

Next, combinations of variables are calculated (710). For example, when the vehicle speed V is set to 11 sections and the target deceleration is set to 9 sections, scenarios combining the vehicle speed and the target deceleration, i.e., 99 scenarios, may be generated.

Finally, results of applying the calculated scenarios are stored. For example, for the 99 scenarios described above, result values according to the 99 scenarios are stored (720). Here, derivation of scenarios has been described in FIG. 7, and step 720 of storing result values according to the derived scenarios will be described in detail in FIG. 8.

Figure 8:
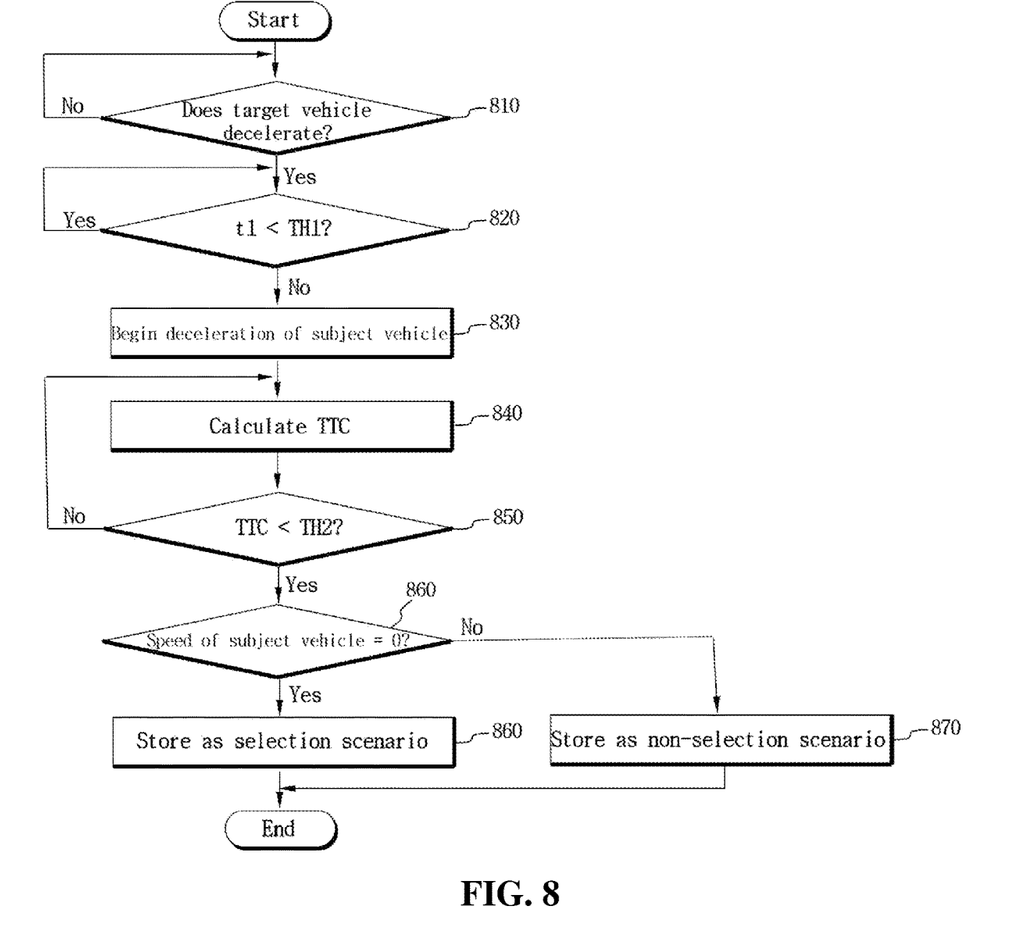
FIG. 8 is a flowchart illustrating a scenario selection process in a collision test method according to an embodiment of the present invention.

FIG. 8 is a flowchart illustrating a scenario of a collision test method according to an embodiment of the present invention.

FIG. 8 is a flowchart illustrating a process of applying the 99 scenarios generated using deceleration and vehicle speed in a collision test method according to an embodiment.

In the collision test method, the target vehicle 2 is controlled to test the operation of the subject vehicle 1. When the target vehicle decelerates (YES at 810) and a first threshold time th1 set in advance is exceeded from the time point of beginning the deceleration of the target vehicle, the subject vehicle begins to decelerate (830).

As described in the driver model of FIG. 6, the threshold time th1 is a time determined in consideration of actual beginning of deceleration, although the target vehicle 2 begins to decelerate, after the driver or the autonomous driving system actually spends a risk determination time of recognizing deceleration of the target vehicle 2 as a risk and a risk response time. In other words, the threshold time th1 may be set in consideration of the time when risk is recognized and determined as a risk and the mechanical time until the brake pedal actually operates.

The threshold time th1 in FIG. 8 may be determined in consideration of the risk determination time and the mechanical time until the brake pedal operates, assuming that the target vehicle 2 begins to decelerate while the target vehicle 2 and the subject vehicle 1 are traveling at the same speed.

However, the threshold time th1 may be set by correcting the threshold time th1 when the speed of the target vehicle 2 is not the same.

For example, when the target vehicle 2 decelerates while the target vehicle 2 accelerates and the subject vehicle 1 also accelerates, a first threshold time may be set by adding a correction value to the threshold time th1. At this point, the correction value may be set to be subdivided according to the degree of acceleration of the target vehicle 2 and the degree of acceleration of the subject vehicle 1. At this point, the correction value may be subdivided by comparing the degree of acceleration of the target vehicle 2 and the subject vehicle 1, i.e., magnitude of acceleration.

Alternatively, when the target vehicle 2 accelerates or the subject vehicle 1 decelerates, the first threshold time may be set by assigning a (−) correction value to the threshold time th1.

Next, deceleration of the subject vehicle begins (830), and a TTC is calculated (840). Specifically, in the vehicle collision test method according to an embodiment, the TTC may be calculated at time intervals of 0.01 [sec].

Accordingly, the TTC calculated at each preset time point (intervals of 0.01 sec) is compared with a preset second threshold time th2 (850). Specifically, the second threshold time th2 may be set to be longer than the first threshold time th1.

When the calculated TTC is shorter than the second threshold time (YES at 850) and the target vehicle is in a stopped state (YES at 860), parameters of corresponding variables are stored in a matrix form as a selection scenario (risk).

Although a case in which the subject vehicle is stopped (i.e., the speed of the subject vehicle is 0) has been described at step 860 as an embodiment, a case in which the displacement (location) of the subject vehicle 1 is the same as the displacement of the target vehicle 2, as well as the case in which the subject vehicle is stopped, may also be selected as a selection scenario.

When a case is selected as a selection scenario, it is a dangerous situation, and a separate output value may be generated according to the stored matrix form.

For example, the vehicle collision test method may be adopted in the subject vehicle 1 to analyze the stored selection scenarios and non-selection scenarios and analyze the driving habits of the subject vehicle 1 using big data considering the storage frequency of each scenario.

Alternatively, when the calculated TTC is longer than the second threshold time (No at 850), the TTC indicates not a dangerous situation, and the corresponding scenario is a non-selection scenario, and parameters of the corresponding variables may be stored in a matrix form.

In addition, as selection scenarios or non-selection scenarios are stored in a matrix form, all variables of individual scenarios are stored, and individual scenarios may be compared using minimum TTC values, and a priority may be derived for each scenario.

According to the vehicle collision test method according to the embodiments of the present invention, safety of a collision test of a vehicle following a preceding vehicle can be enhanced.

In addition, according to the vehicle collision test method according to the embodiments of the present invention, accuracy of the vehicle collision test method can be increased by selecting all possible scenarios of the vehicle collision test method and applying the selected scenarios.

In addition, according to the vehicle collision test method according to the embodiments of the present invention, safety of each vehicle in the case of a collision can be measured by selecting all scenarios possible in the vehicle collision test method and applying the selected scenarios.

However, the effects of the present invention are not limited to the above effects, and may be expanded in various ways without departing from the spirit and scope of the present invention.

The above description is merely an example of the technical spirit of the present invention, and those skilled in the art may make various changes and modifications without departing from the essential characteristics of the present invention. Therefore, the embodiments disclosed in the present invention are intended to explain, not to limit, the technical spirit of the present invention, and the scope of the technical spirit of the present invention is not limited by these embodiments. The protection scope of the present invention should be construed according to the following claims, and all technical spirits within the equivalent range should be construed as being included in the scope of the present invention.

DESCRIPTION OF SYMBOLS

1: Subject vehicle
2: Target vehicle
10: Not avoidable scenario
20: Failure scenario
30: Critical scenario
40: Nominal scenario

What is claimed is:

1. A vehicle collision test method comprising the steps of:
   setting a speed and a target acceleration of a target vehicle;
   observing a speed and an acceleration of a subject vehicle corresponding to the set speed and target acceleration of the target vehicle;
   decelerating the subject vehicle and calculating a time-to-collision (TTC) when a first threshold time is exceeded after deceleration of the target vehicle; and
   storing information on the subject vehicle when the calculated time-to-collision is shorter than a second threshold time and longer than the first threshold time,
   wherein the storing the information on the subject vehicle includes:
   setting the speed of the target vehicle to be divided into section intervals;
   setting the acceleration of the target vehicle to be divided into section intervals;

selecting a plurality of scenarios by combining the set section intervals of the speed of the target vehicle and the set section intervals of the acceleration of the target vehicle; and selecting as a selection scenario when the calculated time-to-collision is shorter than the second threshold time for the plurality of scenarios, wherein the selecting as the selection scenario includes:

calculating a time-to-collision of the subject vehicle at preset time intervals; and selecting a minimum time-to-collision among the calculated time-to-collisions as the selection scenario, wherein the selecting the minimum time-to-collision includes:

storing as the selection scenario when the minimum time-to-collision is shorter than the second threshold time; and storing as a non-selection scenario when the minimum time-to-collision exceeds the second threshold time.

2. The method according to claim 1, wherein the first threshold time is set in consideration of a risk determination time and a pedal transfer mechanical time of the subject vehicle.

3. The method according to claim 2, wherein the first threshold time is calculated in a driving situation in which the speed of the target vehicle equally follows the speed of the target vehicle.

4. The method according to claim 3, wherein the first threshold time is corrected in a driving situation in which the speed of the target vehicle is different from the speed of the target vehicle.

5. The method according to claim 1, wherein storing as the selection scenario further includes storing driving information of the subject vehicle when the minimum time-to-collision is shorter than the second threshold time and the target vehicle stops or displacements of the target vehicle and the target vehicle are equal.

6. The method according to claim 5, wherein the storing the driving information of the subject vehicle includes storing a plurality of variables including the acceleration of the subject vehicle and the time-to-collision calculated at preset time intervals in a matrix form.

7. The method according to claim 1, wherein the selecting the minimum time-to-collision further includes:

storing driving information of the subject vehicle stored as the selection scenario or the non-selection scenario in a matrix form; and analyzing a driving habit of the subject vehicle based on the stored driving information of the subject vehicle.

* * * * *